US007286528B1

(12) United States Patent
Pannell

(10) Patent No.: US 7,286,528 B1
(45) Date of Patent: Oct. 23, 2007

(54) MULTIPLE ADDRESS DATABASES IN A SWITCH WITHOUT THE NEED FOR EXTRA MEMORY

(75) Inventor: Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 1132 days.

(21) Appl. No.: 10/253,183

(22) Filed: Sep. 23, 2002

Related U.S. Application Data

(60) Provisional application No. 60/340,287, filed on Dec. 12, 2001.

(51) Int. Cl.
*H04L 12/28* (2006.01)
(52) U.S. Cl. .................. 370/389; 370/390; 370/393
(58) Field of Classification Search ............ 370/351, 370/360, 380, 381, 389, 390, 392, 393, 412, 370/420, 427–429
See application file for complete search history.

(56) References Cited

U.S. PATENT DOCUMENTS

| 5,914,938 | A | | 6/1999 | Brady et al. ............. 370/401 |
|---|---|---|---|---|
| 5,923,654 | A | * | 7/1999 | Schnell ..................... 370/390 |
| 6,035,105 | A | | 3/2000 | McCloghrie et al. ....... 370/351 |
| 6,084,877 | A | * | 7/2000 | Egbert et al. ............. 370/389 |
| 6,151,324 | A | | 11/2000 | Belser et al. ............. 370/355 |
| 6,266,705 | B1 | | 7/2001 | Ullum et al. ............. 711/216 |
| 6,292,483 | B1 | | 9/2001 | Kerstein ................... 370/392 |
| 6,304,901 | B1 | | 10/2001 | McCloghrie et al. ....... 370/351 |
| 6,457,058 | B1 | * | 9/2002 | Ullum et al. ............. 709/238 |
| 6,615,336 | B1 | * | 9/2003 | Chen et al. ............... 711/202 |
| 6,697,380 | B1 | * | 2/2004 | Egbert et al. ............. 370/469 |

* cited by examiner

*Primary Examiner*—Wellington Chin
*Assistant Examiner*—Saba Tsegaye

(57) ABSTRACT

A method, apparatus, and computer-readable media for transferring data through a switch having a memory, a plurality of ports, and a plurality of address databases storing MAC addresses for devices in communication with the switch, each address database having a different database number comprises receiving a frame of the data on a port of the switch, the port associated with one of the address databases, the frame comprising a destination MAC address; hashing the destination MAC address, thereby producing a hashed MAC address; combining the hashed MAC address and the database number of the address database associated with the port that received the frame, thereby producing a bucket address, the bucket address identifying a plurality of bin addresses, wherein each of the bin addresses identifies a bin in the memory storing a MAC address and a port identifier that identifies one of the ports in the switch; searching the bins for a MAC address matching the destination MAC address; and transmitting the frame to the port identified by the port identifier stored in the bin storing a MAC address matching the destination MAC address.

36 Claims, 5 Drawing Sheets

| 63 52 | 51 48 | 47 40 | 39 32 | 31 24 | 23 16 | 15 8 | 7 0 |
|---|---|---|---|---|---|---|---|
| Port ID | ES | AB0 | AB1 | AB2 | AB3 | AB4 | AB5 |

FIG. 3

MULTIPLE ADDRESS DATABASES IN A SWITCH WITHOUT THE NEED FOR EXTRA MEMORY

CROSS-REFERENCE TO RELATED APPLICATIONS

This application claims the benefit of U.S. Provisional Patent Application Ser. No. 60/340,287, "Multiple Address Databases In A Switch Without The Need For Extra Memory," by Donald Pannell, filed Dec. 12, 2001, the disclosure thereof incorporated by reference herein in its entirety.

BACKGROUND

The present invention relates generally to data communications, and particularly to network switches implementing multiple address databases.

A data communication network permits multiple devices, such as computers and the like, to communicate with each other by exchanging data, often organized as frames, over the network. Such networks include local area networks (LAN), which connect devices in close physical proximity, and wide area networks (WAN), which connect devices separated by greater distances.

It has recently become desirable to segregate the devices connected by such a physical network into smaller groups, referred to as Virtual LANs (VLAN). VLANs are configured using software and hardware so that traffic on one VLAN does not automatically propagate to other VLANs. For example, conventional network switch 100 shown in FIG. 1 includes a switch 102 and a CPU 104. Switch 100 includes six ports p0 through p5, a controller 112, and a memory 108 that stores an address database 110. Port p0 is connected to central processing unit (CPU) 104. Port p5 is connected to a WAN 106. Ports p1 through p4 are connected to devices d1 through d4 such as networks, network enabled computers, and the like.

Further, it is desirable to create two VLANs, VLAN A and VLAN B, such that VLAN A consists of devices d1 through d4 and VLAN B consists of WAN 106, and such that data is exchanged between the VLANs only through CPU 104. One conventional method for isolating the two VLANs in this manner is to provide a port register for each port. The contents of the port register identify the other ports in the switch with which that port can communicate. Because WAN 106 can communicate only with CPU 104, the port register for port p5 identifies only port p0, the CPU port. And because devices d1 through d4 can communicate only with each other and the CPU, the port registers for ports p1 through p4 identify only ports p0 through p4. And because CPU 104 can communicate with any port in switch 102, the port register for port p0 identifies ports p1 through p5.

In some applications it has also become desirable recently to permit the media access control (MAC) address of a device served by a network switch to be associated with multiple ports within the switch. Referring again to FIG. 1, assume that CPU 104 has MAC address 32, WAN 106 has MAC address 33, and devices d1 through d4 have MAC addresses 34 through 37, respectively. When device d1 sends a frame of data to WAN 106, VLAN isolation requires that frame to pass through CPU 104. The source MAC address of the frame sent from device d1 to CPU 104 is 34. However, in a conventional switch, the source MAC address of that frame, when forwarded from CPU 104 to WAN 106, is changed to 32, the source MAC address of the CPU. It is desirable in some applications that the source MAC address of the forwarded frame be 34, the source MAC address of device d1.

Of course, CPU 104 can change the source MAC address of the frame forwarded from CPU 102 to WAN 106 to be 34, but this confuses switch 102, which learns associations between MAC addresses and ports by monitoring the source MAC address of each frame traversing the switch, and by storing the source port identifier (SPID) and source MAC address as an entry in address database 110. Returning to the example, the source MAC address of the frame sent from device d1 to CPU 104 is 34; therefore switch 104 associates MAC address 34 with port p1. Thus switch 102 will send any frame having a destination address of 34 to device d1, as it should. But when CPU 104 forwards the frame to WAN 106, and forces the source address of the frame to be 34, switch 102 associates MAC address 34 with port p0, the CPU port, and will thereafter erroneously send any frame having a destination address of 34 to the CPU.

One approach to permitting a single MAC address to be associated with multiple ports is to employ multiple address databases. Each entry in the databases stores the MAC address, a port associated with that MAC address, and a VLAN identifier (VLAN ID) for that association. Returning to the example, it is desirable to associate MAC address 34 (the MAC address of device d1) with both port p1 (the port for device d1) in VLAN A, and with port p0 (the CPU port) in VLAN B. Therefore address databases 110 should contain two entries for MAC address 34. One of the entries would store MAC address 34, a port identifier for port p1, and VLAN ID=A. The other entry would store MAC address 34, a port identifier for port p0, and VLAN ID=B.

One disadvantage of this approach is that the size of the memory required by the address databases must be increased, sometimes doubling in size or halving the number of MAC addresses that can be stored in the same space. According to this approach, each entry in the address database must store not only the MAC address, port identifier, and VLAN ID, but must also store management bits used for other functions, such as entry locking and aging. The MAC address requires 48 bits. The VLAN ID requires up to 12 bits. If the address databases are implemented as a 64-bit wide memory, only 4 bits remain for the port identifier and the management bits, a number that is generally insufficient. The alternative is to increase memory width. The next generally-available memory width is 128 bits, requiring a two-fold increase in the memory resources (cost, real estate, and power) consumed by the address databases.

SUMMARY

In general, in one aspect, the invention features a method, apparatus, and computer-readable media for transferring data through a switch having a memory, a plurality of ports, and a plurality of address databases storing MAC addresses for devices in communication with the switch, each address database having a different database number. It comprises receiving a frame of the data on a port of the switch, the port associated with one of the address databases, the frame comprising a destination MAC address; hashing the destination MAC address, thereby producing a hashed MAC address; combining the hashed MAC address and the database number of the address database associated with the port that received the frame, thereby producing a bucket address, the bucket address identifying a plurality of bin addresses, wherein each of the bin addresses identifies a bin in the memory storing a MAC address and a port identifier that identifies one of the ports in the switch; searching the bins for a MAC address matching the destination MAC address; and transmitting the frame to the port identified by the port identifier stored in the bin storing a MAC address matching the destination MAC address.

Particular implementations can include one or more of the following features. Combining comprises adding the hashed MAC address and the database number of the address database associated with the port that received the frame. Implementations can comprise receiving a signal identifying a particular one of the ports and identifying a particular one of the address database numbers; associating the particular port with the particular address database number; and transmitting a frame subsequently received on the particular port to a port selected according to the association of the particular port with the particular address database number. The signal is a control signal received by the switch from a processor. The signal is part of a frame received by the particular port.

In general, in one aspect, the invention features a method, apparatus, and computer-readable media for, in a switch having a plurality of ports and a plurality of address databases storing MAC addresses for devices in communication with the switch, learning associations between the ports and the MAC addresses, wherein each address database associated with a database number. It comprises receiving a frame of the data on a port of the switch, the port associated with one of the address databases, the frame comprising a source MAC address; hashing the source MAC address, thereby producing a hashed MAC address; combining the hashed MAC address and the database number of the address database associated with the port that received the frame, thereby producing a bucket address, the bucket address identifying a plurality of bin addresses each identifying a bin in the memory; and storing the source MAC address and a port identifier in one of the bins, the port identifier identifying the port that received the frame.

Particular implementations can include one or more of the following features. Combining comprises adding the hashed MAC address and the database number of the address database associated with the port that received the frame. Implementations can comprise searching the bins for a MAC address matching the source MAC address; and storing the source MAC address and the port identifier in the bin storing the MAC address matching the source MAC address. None of the bins contains a MAC address matching the source MAC address, and at least one of the bins is unlocked and has an age, and implementations can comprise storing the source MAC address and the port identifier in the unlocked bin having the greatest age.

Advantages that can be seen in implementations of the invention include one or more of the following. Multiple address databases are provided for a switch without requiring additional memory. The extra databases permit a single MAC address to be associated with multiple ports of the switch. Despite the presence of multiple address databases, address translation proceeds at full wire speed, and switch learning proceeds at full wire speed for all switch ports simultaneously. The addition of multiple database does not physically separate the database creating hard limits to the number of MAC addresses that can be stored in any one database. This would be the case if the database was divided in half for two separate database, divided in fourths for four databases, etc. This implementation allows each database to use only the number of entries its needs, leaving the remaining entries available for the other databases in use. The use of 2, 3 or any other number of database does not change this. Any number of databases can be added or subtracted as needed without needing to flush and rebuild the entire database (as would be the case if the database was physically divided with each new database number).

The details of one or more implementations are set forth in the accompanying drawings and the description below. Other features will be apparent from the description and drawings, and from the claims.

DESCRIPTION OF DRAWINGS

FIG. 3. shows the format of an entry in an address database.

Figure 1:
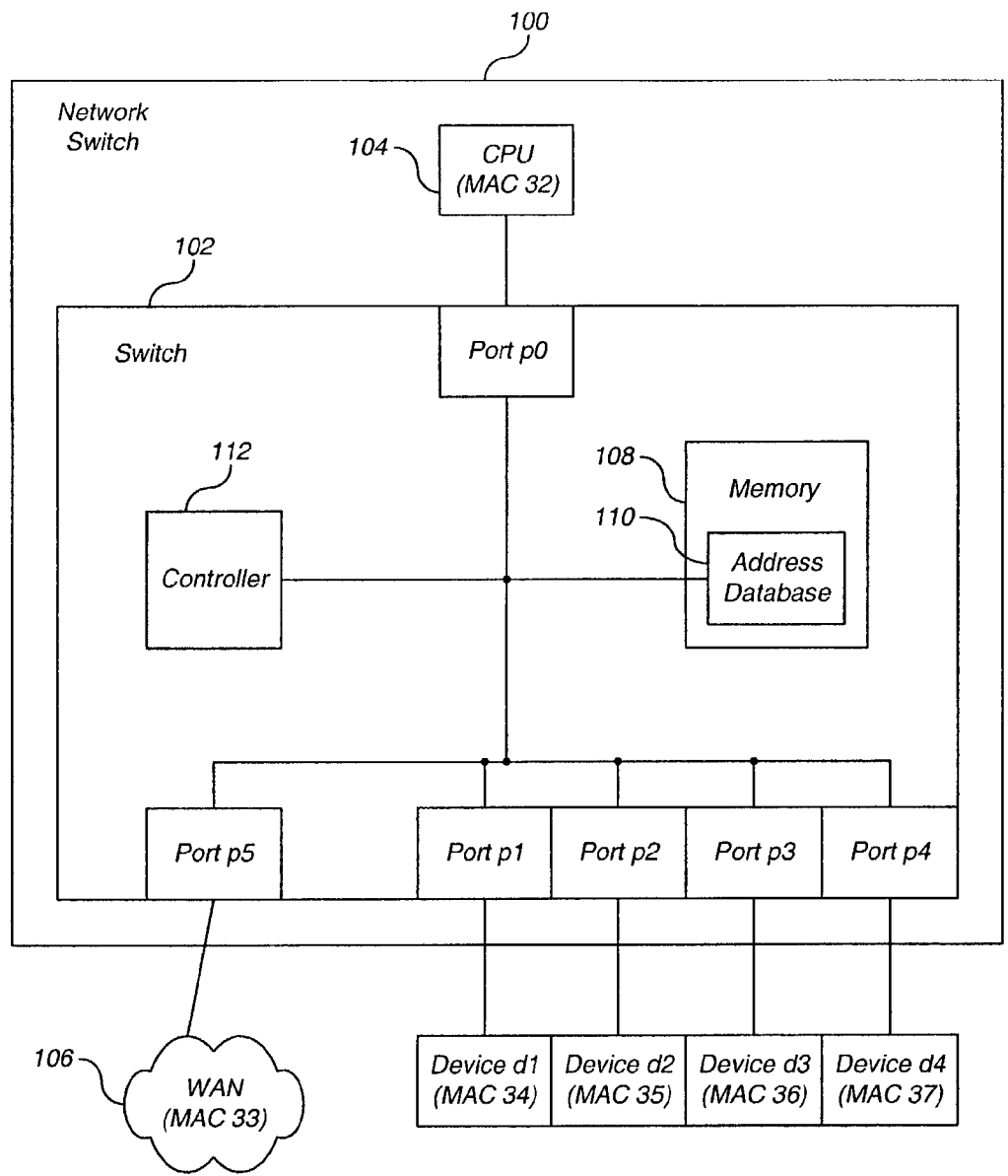
FIG. 1 shows a conventional network switch.

The leading digit(s) of each reference numeral used in this specification indicates the number of the drawing in which the reference numeral first appears.

DETAILED DESCRIPTION

Figure 2:
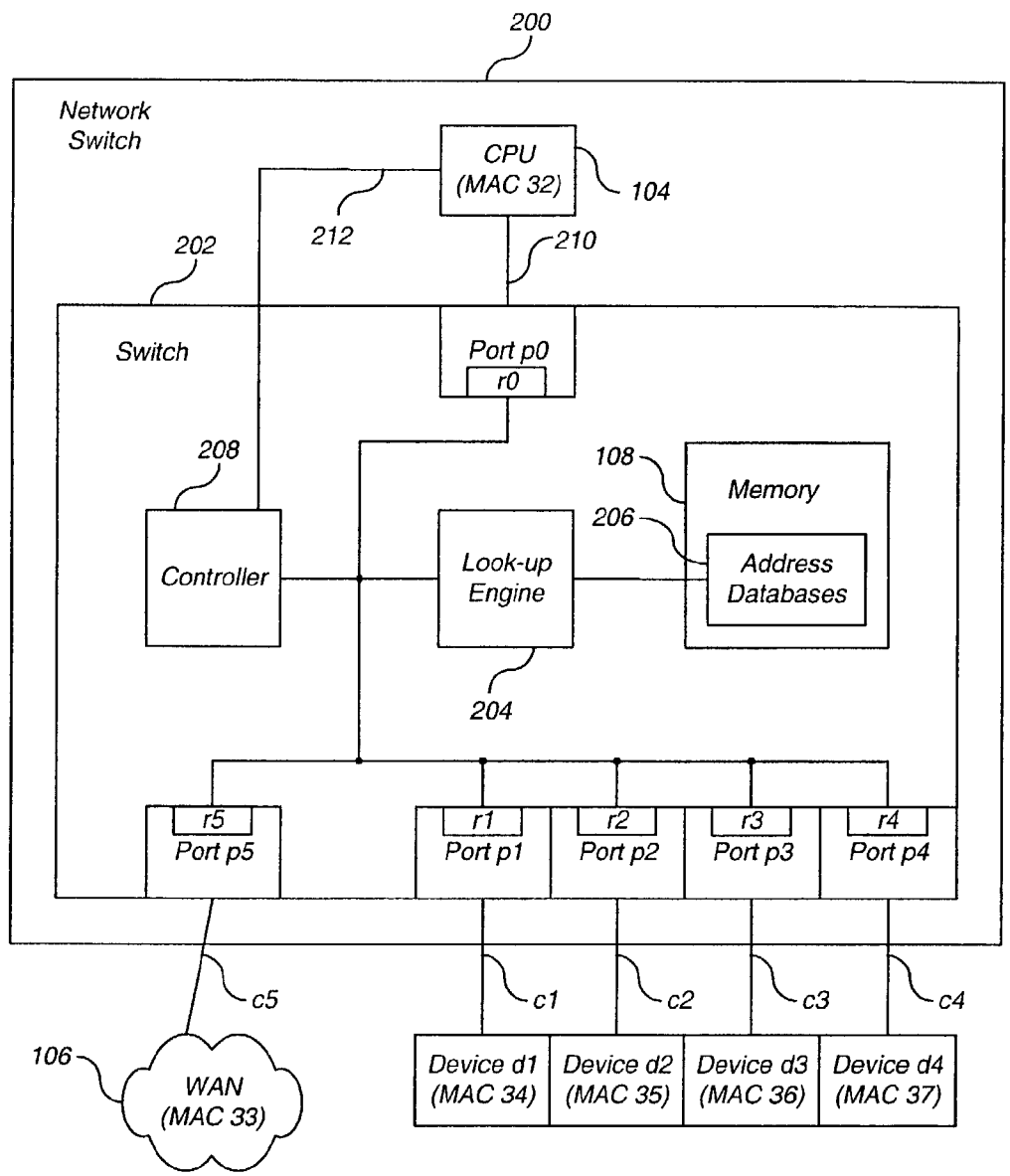
FIG. 2 depicts a network switch according to a preferred embodiment.

FIG. 2 depicts a network switch 200 according to a preferred embodiment. Network switch 200 includes a switch 202 and a CPU 104, each of which can be implemented as an integrated circuit. Switch 202 comprises a controller 208, a look-up engine 204, a memory 108, and ports p0 through p5. CPU 104 exchanges control signals with switch 202 over a control channel 212, and exchanges data with port p0 over a data channel 210. Ports p1 through p4 exchange data with devices d1 through d4 over channels c1 through c4. Port p5 exchanges data with WAN 106 over channel c5. Controller 208 and look-up engine 204 can be implemented together as a single processor, or as two or more separate processors.

Switch 202 differs from switch 102 of FIG. 1 by having a look-up engine 204, and in that each of ports p0 through p5 comprises a port register r0 through r5, respectively. A MAC address can have an entry in each of address databases 206, and can have a different port association in each entry. However, no extra memory is required for address databases 206 because the database number for each entry is not stored in the entry, but is instead determined as described below.

The format of each entry in address databases 206 is shown in FIG. 3. Bits 0-47 of each entry store the six bytes AB0 through AB5 of a MAC address. Bits 48-51 store the entry state (ES) of the entry. The entry state includes information describing the entry, such as age, lock state, and the like. Bits 52-63 store the port identifier (Port ID) of the entry. In a preferred embodiment, Port ID is a vector, with each bit representing one of the ports. In other embodiments, Port ID is a port number or the like representing a single port.

As with the previous example, it is desirable to create two VLANs, VLAN A and VLAN B, such that VLAN A consists of devices d1 through d4 and VLAN B consists of WAN 106, and such that data is exchanged between the VLANs only through CPU 104. It is further desirable to permit the MAC address of a device or network served by switch 202 to be associated with multiple ports within the switch. Referring to FIG. 2, assume that CPU 104 has MAC address 32, WAN 106 has MAC address 33, and devices d1 through d4 have MAC addresses 34 through 37, respectively.

An address database is assigned to each VLAN. Each address database is described by an address database number DBNUM. The number of possible address databases is limited only by the number of bits in DBNUM. In a preferred embodiment, DBNUM has 8 bits, so 256 address databases are possible. DBNUM=0 is assigned to VLAN A. DBNUM=1 is assigned to VLAN B. It should be noted that, while in the described embodiment there is a one-to-one relationship between VLANs and address databases 206, other embodiments have other relationships. For example, multiple VLANs can share a single address database. This feature saves memory because the size of address databases 206 depends on the number of databases, rather than on the number of VLANs. Further, embodiments of the invention can have more than two VLANs, each of which can comprise a LAN, WAN, or other type of network or device.

Each of port registers r1 through r5 is loaded with a DBNUM indicating the database number for that port. In a preferred embodiment, default DBNUMs can be loaded into port registers r1 through r5 during power-up reset of network switch 200. This can be done in software by the CPU or by other means. In the example, WAN 106 belongs to VLAN B, which has DBNUM=1. Therefore DBNUM=1 is loaded into port register r5 (the port register for WAN port p5). Each of LAN devices d1 through d4 belongs to VLAN A, which has DBNUM=0. Therefore DBNUM=0 is loaded into each of port registers r1 through r4 (the port registers for LAN ports p1 through p4, respectively). But CPU 104 belongs to both VLAN A and VLAN B, so CPU 104 changes the DBNUM in port register r0 (the port register for CPU port p0) based on the destination port of the frame the CPU will transmit next.

In some embodiments, CPU 104 includes a buffer for each address database, and executes a direct memory access (DMA) process that changes the DBNUM in port register r0 using control channel 212 before changing buffers. While the DMA process transmits the contents of one of the buffers to switch 202, CPU 104 fills the other buffers for later transmission to the switch. When a buffer empties, CPU 104 writes a different DBNUM to port register r0 and the DMA process begins to transmit from the buffer for that DBNUM.

In other embodiments, CPU 104 has only one buffer that transmits frames for all of the address databases in switch 202. According to these embodiments, some or all of the frames include a field that contains a DBNUM. When switch 202 receives such a frame, it writes the DBNUM to CPU port register r0. In some embodiments, the field is a trailer in a frame for one address database followed by one or more frames for a different address database. In some embodiments, the field is a header in a frame for one address database that is preceded by a frame for a different address database. In some embodiments, the field is transmitted in a null frame that is transmitted between frames for different address databases. Such a null frame can be used to initialize port register r0 in any of these embodiments.

Figure 4:
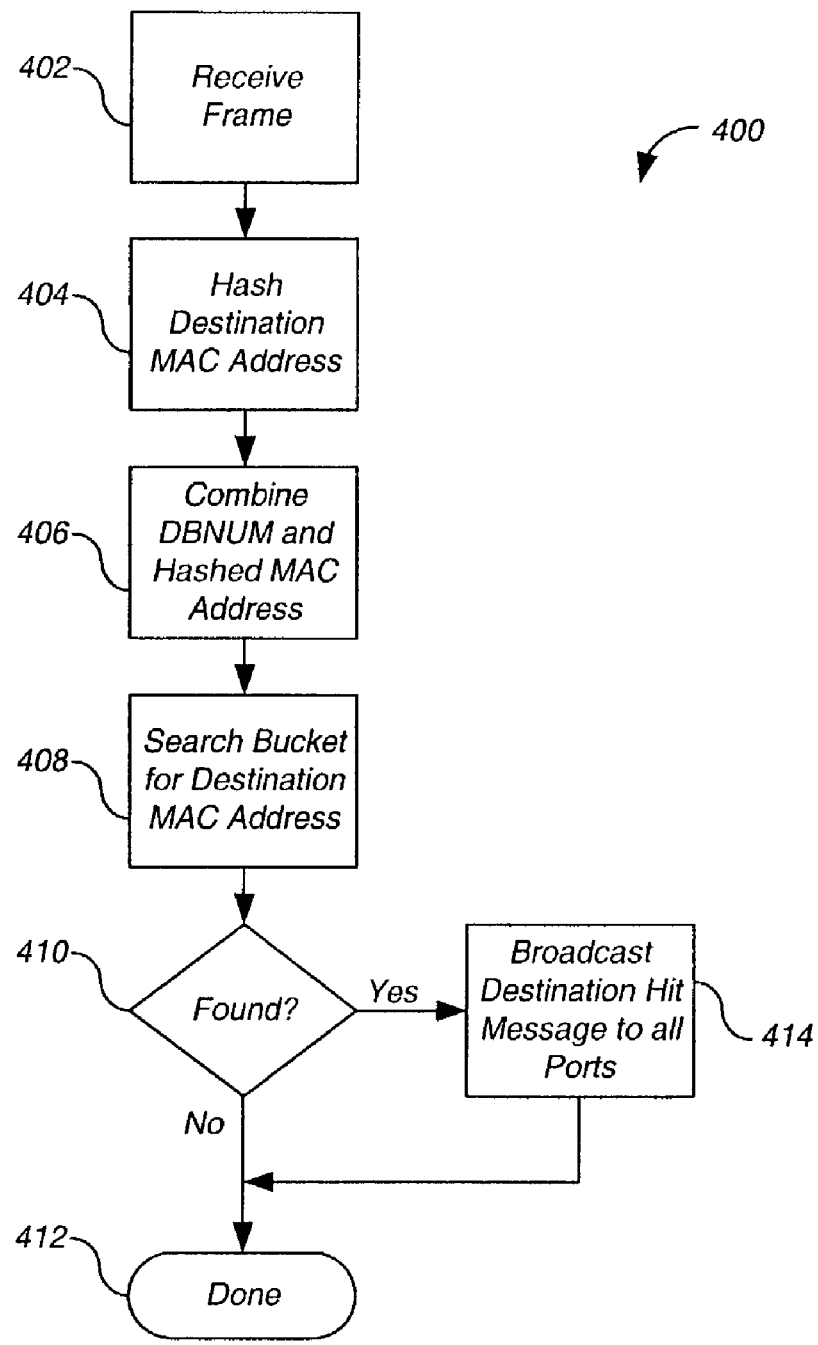
FIG. 4 illustrates a translation process performed by a look-up engine.

FIG. 4 illustrates a translation process 400 performed by look-up engine 204. Switch 202 receives a frame of data on a port of the switch (step 402). Switch 202 transfers the destination MAC address of the frame, and the DBNUM from the port register of the port that received the frame, to look-up engine 204. Look-up engine 204 hashes the destination MAC address of the frame (step 404) according to techniques well-known in the relevant arts. In a preferred embodiment, the 48-bit destination MAC address is hashed to produce a 16-bit hashed MAC address.

Look-up engine 204 then combines the hashed MAC address and the DBNUM to produce a bucket address (step 406). In a preferred embodiment, look-up engine 204 simply adds the 8 even numbered bits of the hashed MAC address and the DBNUM to produce an 8-bit bucket address. Therefore multiple entries can occur for a single MAC address; the memory address of each entry is offset by its DBNUM, resulting in a uniform distribution of entries in memory.

The bucket address identifies a plurality of bins in memory 108, each having a bin address that identifies a memory location in address databases 206 that stores a MAC address and a port identifier. In a preferred embodiment, each bucket contains 4 bins, although other numbers of bins can be used. Look-up engine 204 then searches these bins for a MAC address that matches the destination MAC address of the frame (step 408). If no match is found (step 410), process 400 ends (step 412). When the port that received the frame receives no response after a predetermined period, the port simply floods the frame to all of the other ports in switch 202. Of course, if per-port VLANs are used, the flood is limited to the ports in the VLAN of the port that received the frame.

However, if a match is found (step 410), look-up engine 204 broadcasts, to all of the ports in switch 202, a hit message including a hit indication (indicating a successful translation), the port identifier of the port that received the frame (the SPID), and the port identifier stored in the bin of the matching MAC address (step 414), which is the destination port identifier (DPID). Then process 400 ends (step 412). The port that received the frame recognizes the hit message by the DPID contained therein, and then transmits the frame to the port identified by the DPID in the hit message. Of course, the destination addresses of this transmission can be modified according to per-port VLAN techniques and the like.

Figure 5:
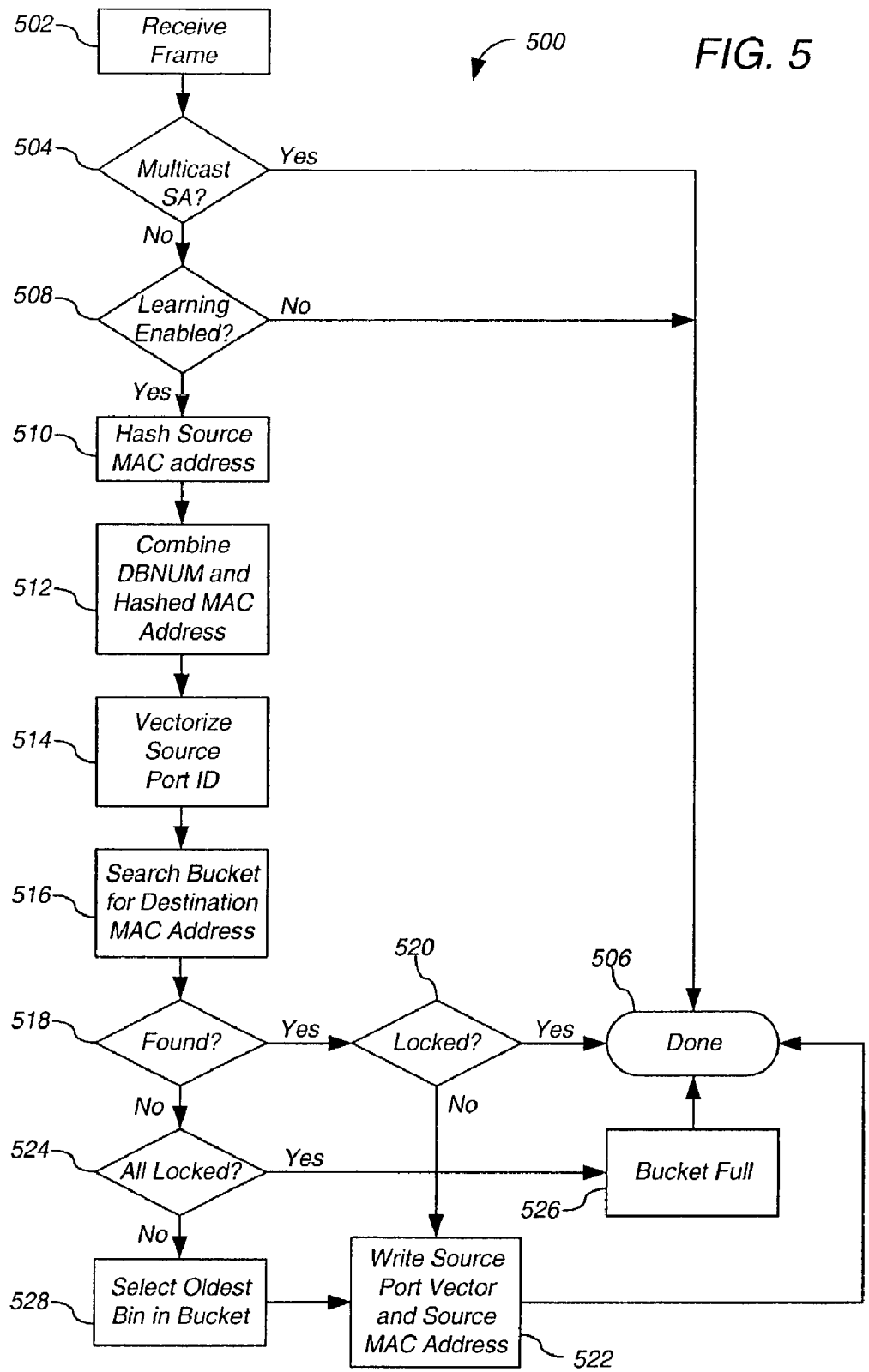
FIG. 5 illustrates a learning process performed by a look-up engine.

FIG. 5 illustrates a learning process 500 performed by look-up engine 204. The frame's source MAC address is used for learning. Switch 202 receives a valid frame of data on a port of the switch (step 502). Switch 202 then determines whether the frame's source address is a multicast address (step 504). If so, process 500 ends (step 506), because switch 202 does not attempt to learn from frames with multicast source addresses. If the frame does not contain a multicast source address, switch 202 determines whether learning is enabled (step 508). CPU 104 can disable learning using control channel 212. If learning is disabled, process 500 ends (step 506). If learning is enabled, switch 202 transfers the source MAC address of the frame, and the DBNUM from the port register of the port that received the frame, to look-up engine 204. Look-up engine 204 hashes the source MAC address of the frame (step 510). In a preferred embodiment, the 48-bit source MAC address is hashed to produce a 16-bit hashed MAC address.

Look-up engine 204 then combines the hashed MAC address and the DBNUM to produce a bucket address (step 512). In a preferred embodiment, look-up engine 204 simply adds the 8 even numbered bits of the hashed MAC address and the DBNUM to produce an 8-bit bucket address. No matter what hash calculation is used the same method must be used for both the destination address look-up and the source address learning. In a preferred embodiment, port numbers are stored as port vectors. Therefore look-up engine 204 vectorizes the SPID of the frame (step 514) to produce a source port vector (SPV). Of course, other types of source port identifiers can be used, such as the port number.

The bucket address identifies a plurality of bins, each having a bin address that identifies a memory location in address databases 206 that stores a MAC address and a port identifier. In a preferred embodiment, each bucket contains 4 bins, although other numbers of bins can be used. Look-up engine 204 then searches the bins for a MAC address that matches the source MAC address of the frame (step 516). If a match is found (step 518), look-up engine 204 determines whether the matching entry is locked (step 520). Entries may be locked only by CPU 104. Locked entries are persistent because they never age, and so are never overwritten, as described below. If the matching entry is locked, then process 500 ends (step 506). If not, look-up engine 204 overwrites the contents of the bin with the source port vector of the port that received the frame, and the source MAC address of that frame (step 522). Then process 500 ends (step 506).

However, if no match is found (step 518), then look-up engine 204 checks to see if any of the bins in the bucket are unlocked (step 524). If all of the bins are locked, then look-up engine 204 sends a "bucket full" interrupt signal to CPU 104 (step 526), which takes corrective action. The CPU can then decide to change the hash or hash bit selection function (if these options are supported in the hardware) and flush then re-build the database.

However, if any of the bins in the bucket are unlocked (step 524), then look-up engine 204 selects the oldest bin in the bucket (step 528) by examining the entry state field of the bin, which is decremented by the aging logic as the bin ages. Look-up engine 204 overwrites the contents of the oldest unlocked bin in the bucket with the source port vector of the port that received the frame, and the source MAC address of that frame (step 522). Then process 500 ends (step 506).

An example of the contents of address databases 206 for switch 202 are shown in Table 1, continuing the described example. The database includes 12 entries, each containing a MAC address and a Port ID. For clarity, Table 1 also includes shows the memory address, hashed MAC address, and address database number DBNUM for each entry, although these items are not stored in address databases 206. Table 1 assumes that MAC addresses 32 through 37 hash to bucket numbers 2, 4, 6, 8, 10, and 12, respectively.

TABLE 1

| Bucket Number | DBNUM | Hashed MAC Address | MAC Address | Port ID |
| --- | --- | --- | --- | --- |
| 2 | 0 | 2 | 32 | 0 |
| 3 | 1 | 2 | 32 | 0 |
| 4 | 0 | 4 | 33 | Empty |
| 5 | 1 | 4 | 33 | 5 |
| 6 | 0 | 6 | 34 | 1 |
| 7 | 1 | 6 | 34 | 0 |
| 8 | 0 | 8 | 35 | 2 |
| 9 | 1 | 8 | 35 | 0 |
| 10 | 0 | 10 | 36 | 3 |
| 11 | 1 | 10 | 36 | 0 |
| 12 | 0 | 12 | 37 | 4 |
| 13 | 1 | 12 | 37 | 0 |

Referring to Table 1, each MAC address has two entries, one for database 0, and one for database 1. CPU 104 has MAC address 32, and is associated with port 0 in both VLANs; therefore CPU 104 is associated with port 0 in both databases. WAN 106 (MAC address 33) exists only in VLAN 1, where it is associated with port 5, and so has no port association in database 0. In this case the empty location is available for other MAC address from any database number since each bucket is database number independent. Each of the LAN devices d1 through d4 is associated with a respective one of ports p1 through p4 in database 0 (VLAN 0), and is associated with the CPU port p0 in VLAN 1.

Embodiments of the present invention provide a two-way mapping between MAC addresses and address databases. For example, to determine the address databases in which a MAC address appears, one need only find all of the entries that contain the MAC address. For each entry, the difference between the hashed MAC address and the memory address of the entry is the address database number DBNUM of the entry.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus for transferring data through a network switch, comprising:
   a plurality of ports;
   a memory to store a plurality of address databases storing MAC addresses for devices in communication with the network switch, each address database having a different database number;
   wherein one of the ports receives a frame of the data, the one of the ports associated with one of the address databases, the frame comprising a destination MAC address; and
   a controller to hash the destination MAC address, thereby producing a hashed MAC address, combine the hashed MAC address and the database number of the address database associated with the port that received the frame, thereby producing a bucket address, the bucket address identifying a plurality of bin addresses, wherein each of the bin addresses identifies a bin in the memory storing a MAC address and a port identifier that identifies one of the ports in the switch, search the bins for a MAC address matching the destination MAC address, and transmit the frame to the port identified by the port identifier stored in the bin storing a MAC address matching the destination MAC address.

2. The apparatus of claim 1, wherein the controller adds the hashed MAC address and the database number of the address database associated with the port that received the frame, thereby producing the bucket address.

3. The apparatus of claim 1, further comprising;
a plurality of port registers each associated with a corresponding one of the ports;
wherein the controller receives a signal identifying a particular one of the ports and identifying a particular one of the address database numbers; and stores the particular address database number in the port register corresponding to the particular port; and transmits frames received on the particular port according to the address database number stored in the port register for the particular port.

4. The apparatus of claim 3, wherein the signal is a control signal received by the switch from a processor.

5. The apparatus of claim 3, wherein the signal is part of a frame received by the particular port.

6. An apparatus for transferring data through a network switch, comprising:
a plurality of port means;
memory means for storing a plurality of address databases storing MAC addresses for devices in communication with the network switch, each address database having a different database number;
wherein one of the port means receives a frame of the data, the one of the port means associated with one of the address databases, the frame comprising a destination MAC address; and
controller means for hashing the destination MAC address, thereby producing a hashed MAC address, combining the hashed MAC address and the database number of the address database associated with the port means that received the frame, thereby producing a bucket address, the bucket address identifying a plurality of bin addresses, wherein each of the bin addresses identifies a bin in the memory means storing a MAC address and a port identifier that identifies one of the port means in the switch, searching the bins for a MAC address matching the destination MAC address, and transmitting the frame to the port means identified by the port identifier stored in the bin storing a MAC address matching the destination MAC address.

7. The apparatus of claim 6, wherein the controller means adds the hashed MAC address and the database number of the address database associated with the port means that received the frame, thereby producing the bucket address.

8. The apparatus of claim 6, further comprising;
a plurality of port register means each associated with a corresponding one of the port means;
wherein the controller means receives a signal identifying a particular one of the port means and identifying a particular one of the address database numbers; and stores the particular address database number in the port register means corresponding to the particular port means; and transmits frames received on the particular port means according to the address database number stored in the port register means for the particular port means.

9. The apparatus of claim 8, wherein the signal is a control signal received by the switch from a processor.

10. The apparatus of claim 8, wherein the signal is part of a frame received by the particular port means.

11. A method for transferring data through a switch having a memory, a plurality of ports, and a plurality of address databases storing MAC addresses for devices in communication with the switch, each address database having a different database number, comprising:
receiving a frame of the data on a port of the switch, the port associated with one of the address databases, the frame comprising a destination MAC address;
hashing the destination MAC address, thereby producing a hashed MAC address;
combining the hashed MAC address and the database number of the address database associated with the port that received the frame, thereby producing a bucket address, the bucket address identifying a plurality of bin addresses, wherein each of the bin addresses identifies a bin in the memory storing a MAC address and a port identifier that identifies one of the ports in the switch;
searching the bins for a MAC address matching the destination MAC address; and
transmitting the frame to the port identified by the port identifier stored in the bin storing a MAC address matching the destination MAC address.

12. The method of claim 11, wherein combining comprises adding the hashed MAC address and the database number of the address database associated with the port that received the frame.

13. The method of claim 11, further comprising:
receiving a signal identifying a particular one of the ports and identifying a particular one of the address database numbers;
associating the particular port with the particular address database number; and
transmitting a frame subsequently received on the particular port to a port selected according to the association of the particular port with the particular address database number.

14. The method of claim 13, wherein the signal is a control signal received by the switch from a processor.

15. The method of claim 13, wherein the signal is part of a frame received by the particular port.

16. Computer-readable media embodying instructions executable by a computer to perform a method for transferring data through a switch having a memory, a plurality of ports, and a plurality of address databases storing MAC addresses for devices in communication with the switch, each address database having a different database number, the method comprising:
receiving a frame of the data on a port of the switch, the port associated with one of the address databases, the frame comprising a destination MAC address;
hashing the destination MAC address, thereby producing a hashed MAC address;
combining the hashed MAC address and the database number of the address database associated with the port that received the frame, thereby producing a bucket address, the bucket address identifying a plurality of bin addresses, wherein each of the bin addresses identifies a bin in the memory storing a MAC address and a port identifier that identifies one of the ports in the switch;

searching the bins for a MAC address matching the destination MAC address; and transmitting the frame to the port identified by the port identifier stored in the bin storing a MAC address matching the destination MAC address.

17. The media of claim 16, wherein combining comprises adding the hashed MAC address and the database number of the address database associated with the port that received the frame.

18. The media of claim 16, wherein the method further comprises:

receiving a signal identifying a particular one of the ports and identifying a particular one of the address database numbers;

associating the particular port with the particular address database number; and transmitting a frame subsequently received on the particular port to a port selected according to the association of the particular port with the particular address database number.

19. The media of claim 18, wherein the signal is a control signal received by the switch from a processor.

20. The media of claim 18, wherein the signal is part of a frame received by the particular port.

21. An apparatus for learning associations between ports and MAC addresses in a network switch, comprising:

a plurality of the ports;

a memory to store a plurality of address databases storing the MAC addresses for devices in communication with the network switch, each address database associated with a database number;

wherein one of the ports receives a frame of data, the one of the ports associated with one of the address databases, the frame comprising a source MAC address;

a controller to hash the source MAC address, thereby producing a hashed MAC address; combine the hashed MAC address and the database number of the address database associated with the port that received the frame, thereby producing a bucket address, the bucket address identifying a plurality of bin addresses each identifying a bin in the memory; and store the source MAC address and a port identifier in one of the bins, the port identifier identifying the port that received the frame.

22. The apparatus of claim 21, wherein the controller adds the hashed MAC address and the database number of the address database associated with the port that received the frame, thereby producing the bucket address.

23. The apparatus of claim 21, wherein the controller searches the bins for a MAC address matching the source MAC address; and stores the source MAC address and the port identifier in the bin storing the MAC address matching the source MAC address.

24. The apparatus of claim 21, wherein none of the bins contains a MAC address matching the source MAC address, and at least one of the bins is unlocked and has an age, and wherein the controller stores the source MAC address and the port identifier in the unlocked bin having the greatest age.

25. An apparatus for learning associations in a network switch, comprising:

a plurality of port means;

memory means for storing a plurality of address databases storing MAC addresses for devices in communication with the network switch, each address database associated with a database number;

wherein one of the port means receives a frame of data, the one of the port means associated with one of the address databases, the frame comprising a source MAC address;

controller means for hashing the source MAC address, thereby producing a hashed MAC address; combining the hashed MAC address and the database number of the address database associated with the port means that received the frame, thereby producing a bucket address, the bucket address identifying a plurality of bin addresses each identifying a bin in the memory; and storing the source MAC address and a port identifier in one of the bins, the port identifier identifying the port means that received the frame.

26. The apparatus of claim 25, wherein the controller means adds the hashed MAC address and the database number of the address database associated with the port means that received the frame, thereby producing the bucket address.

27. The apparatus of claim 25, wherein the controller means searches the bins for a MAC address matching the source MAC address; and stores the source MAC address and the port identifier in the bin storing the MAC address matching the source MAC address.

28. The apparatus of claim 25, wherein none of the bins contains a MAC address matching the source MAC address, and at least one of the bins is unlocked and has an age, and wherein the controller means stores the source MAC address and the port identifier in the unlocked bin having the greatest age.

29. A method, in a switch having a plurality of ports and a plurality of address databases storing MAC addresses for devices in communication with the switch, for learning associations between the ports and the MAC addresses, wherein each address database associated with a database number, comprising:

receiving a frame of data on a port of the switch, the port associated with one of the address databases, the frame comprising a source MAC address;

hashing the source MAC address, thereby producing a hashed MAC address;

combining the hashed MAC address and the database number of the address database associated with the port that received the frame, thereby producing a bucket address, the bucket address identifying a plurality of bin addresses each identifying a bin in the memory; and storing the source MAC address and a port identifier in one of the bins, the port identifier identifying the port that received the frame.

30. The method of claim 29, wherein combining comprises adding the hashed MAC address and the database number of the address database associated with the port that received the frame.

31. The method of claim 29, further comprising:

searching the bins for a MAC address matching the source MAC address; and storing the source MAC address and the port identifier in the bin storing the MAC address matching the source MAC address.

32. The method of claim 29, wherein none of the bins contains a MAC address matching the source MAC address, and at least one of the bins is unlocked and has an age, further comprising:

storing the source MAC address and the port identifier in the unlocked bin having the greatest age.

33. Computer-readable media embodying instructions executable by a computer to perform a method, in a switch having a plurality of ports and a plurality of address databases storing MAC addresses for devices in communication with the switch, for learning associations between the ports and the MAC addresses, wherein each address database associated with a database number, the method comprising:
    receiving a frame of data on a port of the switch, the port associated with one of the address databases, the frame comprising a source MAC address;
    hashing the source MAC address, thereby producing a hashed MAC address;
    combining the hashed MAC address and the database number of the address database associated with the port that received the frame, thereby producing a bucket address, the bucket address identifying a plurality of bin addresses each identifying a bin in the memory; and
    storing the source MAC address and a port identifier in one of the bins, the port identifier identifying the port that received the frame.

34. The media of claim 33, wherein combining comprises adding the hashed MAC address and the database number of the address database associated with the port that received the frame.

35. The media of claim 33, wherein the method further comprises:
    searching the bins for a MAC address matching the source MAC address; and
    storing the source MAC address and the port identifier in the bin storing the MAC address matching the source MAC address.

36. The media of claim 33, wherein none of the bins contains a MAC address matching the source MAC address, and at least one of the bins is unlocked and has an age, further comprising:
    storing the source MAC address and the port identifier in the unlocked bin having the greatest age.

* * * * *

UNITED STATES PATENT AND TRADEMARK OFFICE
CERTIFICATE OF CORRECTION

PATENT NO. : 7,286,528 B1
APPLICATION NO. : 10/253183
DATED : October 23, 2007
INVENTOR(S) : Donald Pannell It is certified that error appears in the above-identified patent and that said Letters Patent is hereby corrected as shown below:

Column 3, Line 63   Delete "database" and insert -- databases -- after "separate"
Column 3, Line 65   Delete "its" and insert -- it --
Column 6, Line 29   Delete "DPID" and insert -- SPID --
Column 7, Line 36   Delete "shows" after "includes"

Signed and Sealed this

Twenty-second Day of January, 2008

JON W. DUDAS
*Director of the United States Patent and Trademark Office*